UNITED STATES PATENT OFFICE.

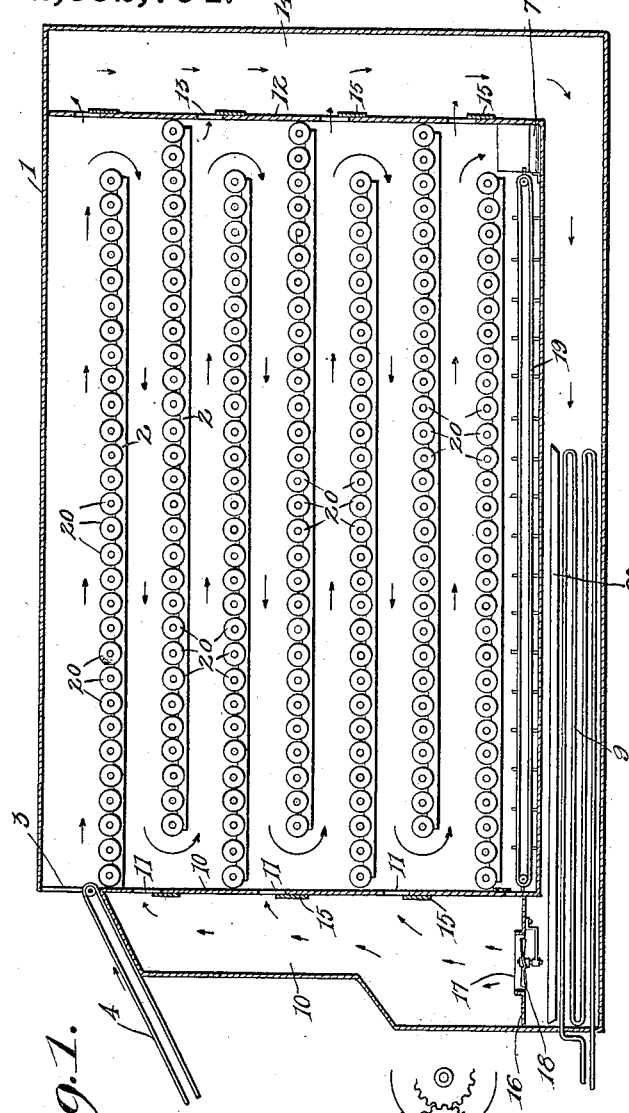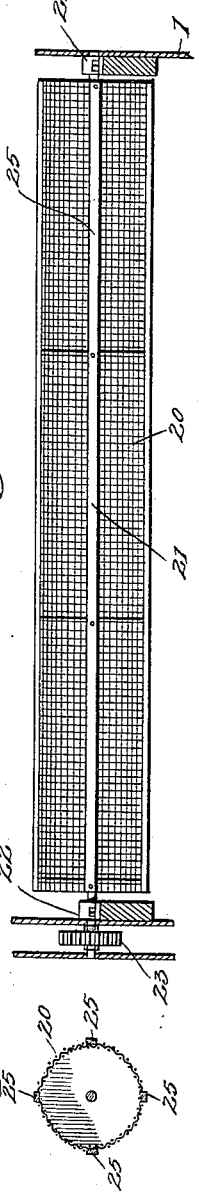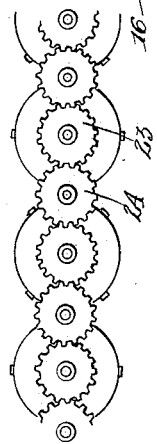

WILBUR PUTNAM AND GARFIELD D. LONGMAN, OF LAKE CHARLES, LOUISIANA.

GRAIN-DRIER.

1,392,794.      Specification of Letters Patent.      Patented Oct. 4, 1921.

Application filed May 8, 1920. Serial No. 379,875.

*To all whom it may concern:*

Be it known that we, WILBUR PUTNAM and GARFIELD D. LONGMAN, both citizens of the United States, and residents of Lake Charles, in the parish of Calcasieu and State of Louisiana, have invented a new and improved Grain-Drier, of which the following is a full, clear, and exact description.

This invention relates to improvements in grain driers, an object of the invention being to provide an improved arrangement of racks consisting each of a series of revolving screens or cylinders which serve to propel the grain through the drier and allow a free circulation of air to thoroughly dry the grain.

A further object is to provide a drier of the character stated having improved means for compelling a continuous circuit of air, the air being heated at one point in the circuit and after passing through the drier, returns to such heating point so that the same air can be utilized in a continuous circulation.

With these and other objects in view the invention consists in certain novel features of construction, and combinations and arrangements of parts as will be more fully hereinafter described and pointed out in the claims.

In the accompanying drawings—

Figure 1 is a view in vertical longitudinal section through the drier showing the rollers of the respective racks in end elevation.

Fig. 2 is an enlarged view in longitudinal section through one of the rollers and also showing in section the parts adjacent to the ends of the roller.

Fig. 3 is a view in transverse section through the roller.

Fig. 4 is an end elevation showing the gear train connecting the rollers of the racks.

1 represents the casing of our improved drier which is provided with a vertical series of substantially horizontal racks 2, these racks having staggered relationship so that each rack discharges at its end onto the rack below and the grain is deposited from one rack onto the one next below and thus moved throughout the drier.

The casing 1 is provided with an inlet 3 at its upper portion at one end through which the grain is supplied by a conveyer 4 and deposited upon the upper rack 2. An outlet 5 is made in the side of the casing 1 and a conveyer 7 is located in the casing and receives the grain from the lowermost rack and carries it out of the drier.

An air heating chamber 8 is formed below the bottom of the casing 1 and contains a steam coil 9 or other means for heating the air. A flue 10 connects one end of the chamber 8 with the drier casing 1, and the end wall 10 of said drier casing is made with openings 11 through which the heated air passes into the casing 1 and over and through the racks therein.

The opposite end 12 of the drier casing is provided with openings 13 through which the air from the casing 1 escapes into a flue 14 and is directed by said flue 14 back into the heating chamber 8. By reason of this construction, the air heated by the steam coil 9 has a continuous circuit and in its passage through the drier takes up the moisture of the grain.

The openings 11 and 13 may have suitable dampers or gates 15 which may be operated to control the size of said openings to properly perform the functions intended.

A partition 16 is located in the flue 10 and has a circular air passage 17 therein in which a rotary fan or blower 18 is mounted, and this fan or blower may be operated in any suitable manner to induce a draft of air in accordance with the operation as above described. An endless conveyer or chain drag 19 is provided below the lowest rack 2 for the purpose of removing such grain as shells or shatters off while being dried, carrying it into position to be removed by the outlet conveyer 7.

The racks 2 each comprise a normally horizontal series of cylindrical screen rollers 20, one of which is shown in longitudinal section in Fig. 2. These rollers are relatively close together and the rollers on each rack turn in the same direction so as to carry the grain longitudinally of the rack and yet permit a free circulation of air through the grain to thoroughly dry the same.

The rollers 20 are fixed to shafts 21 which are mounted in suitable bearings 22 at the sides of the drier, and said shafts at one end have pinions 23 fixed thereon. Idle pinions 24 are interposed between the pinions 23 so that each rack is operated by a gear train in any approved manner to compel all of the rollers of the same rack to turn in the same direction and convey the grain through the path indicated by the arrows in Fig. 1.

The rollers 20 not only feed the grain forwardly, but exercise a certain amount of agitation exposing all particles of the grain to the action of the warm air passing through the drier, and hence, facilitate the drying action for which our invention was devised.

The rollers 20 may be composed of wire mesh as indicated, having strengthening slats 25 thereon, but we, of course, may construct these rollercs of various materials and do not wish to be limited to the particular form thereof.

A water pan 9ª may be provided above the steam coil 9 to regulate the moisture content of the air. This pan 9ª, properly proportioned in size, and kept supplied with water, constitutes an automatic moisture control. The heated radiator causes an evaporation of the water to correspond to the temperature condition. This is very important to the successful drying of rice. Many failures in the past have been caused by a lack of moisture regulation in the carrying out of the drying operation in connection with the milling industry, resulting in cracked or broken rice. With this moisture control the correct humidity is possible, and hence, a much higher temperature can be employed to reduce the length of time for the operation without injuring the grain.

Various slight changes might be made in the general form and arrangement of parts described without departing from the invention, and hence we do not limit ourselves to the precise details set forth, but consider ourselves at liberty to make such changes and alterations as fairly fall within the spirit and scope of the appended claims.

We claim:

1. A drier, comprising a casing, a series of superimposed racks in the casing, each rack depositing on the rack below, each of said racks comprising a series of rollers, pinions secured to turn with the rollers, idle pinions between the first-mentioned pinions, whereby said rollers are compelled to turn in the same direction, and means for inducing a current of air through the drier and the racks thereof.

2. A drier, comprising a casing having an inlet at its upper end, and an outlet at its lower end, racks in said casing, each rack comprising a series of perforated rollers, a conveyer below the lowest rack, and an outlet conveyer communicating with said outlet and onto which said first-mentioned conveyer is adapted to deposit.

3. A drier, comprising a casing having a drying chamber therein, a heating chamber below the drying chamber, flues at the ends of the casing separated from the drying chamber by perforated walls and communicating with the heating chamber, a blower in one of said flues compelling a circulation of air through the flues, drying chamber and heating chamber, racks in the drying chamber comprising each a series of reticulated rollers, and means for turning the rollers of each rack in the same direction and the rollers of adjacent racks in opposite directions.

4. A drier, comprising a casing having a drying chamber therein, a heating chamber below the drying chamber, flues at the ends of the casing separated from the drying chamber by perforated walls and communicating with the heating chamber, a blower in one of said flues compelling a circulation of air through the flues, drying chamber and heating chamber, racks in the drying chamber comprising each a series of reticulated rollers, means for turning the rollers of each rack in the same direction and the rollers of adjacent racks in opposite directions, a steam coil in the heating chamber, and a water pan above the coil.

WILBUR PUTNAM.
GARFIELD D. LONGMAN.